(12) United States Patent
Guo

(10) Patent No.: US 8,792,237 B2
(45) Date of Patent: Jul. 29, 2014

(54) ELECTRONIC DEVICE WITH SUPPORT MECHANISM

(75) Inventor: Ji-Bing Guo, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 106 days.

(21) Appl. No.: 13/570,402

(22) Filed: Aug. 9, 2012

(65) Prior Publication Data

US 2013/0249360 A1   Sep. 26, 2013

(30) Foreign Application Priority Data

Mar. 22, 2012 (CN) .......................... 2012 1 0077778

(51) Int. Cl.
*H05K 5/00* (2006.01)
*H05K 7/00* (2006.01)
*G06F 1/16* (2006.01)

(52) U.S. Cl.
USPC ................................ 361/679.59; 361/679.55

(58) Field of Classification Search
USPC ........................... 361/679.55, 679.56, 679.59
See application file for complete search history.

(56) References Cited

U.S. PATENT DOCUMENTS

| | | | | |
|---|---|---|---|---|
| 6,053,589 A * | 4/2000 | Lin | ............................... | 312/271 |
| 6,831,229 B1 * | 12/2004 | Maatta et al. | ................... | 174/66 |
| 7,566,043 B2 * | 7/2009 | Chen | ............................. | 248/616 |
| 7,926,781 B2 * | 4/2011 | Wang | ............................. | 248/685 |
| 7,950,611 B2 * | 5/2011 | Tracy et al. | ................ | 248/176.3 |
| 8,220,771 B2 * | 7/2012 | Wang | ............................. | 248/685 |
| 2002/0139909 A1 * | 10/2002 | Oyama et al. | .............. | 248/188.8 |

* cited by examiner

*Primary Examiner* — Anthony Haughton
(74) *Attorney, Agent, or Firm* — Novak Druce Connolly Bove + Quigg LLP

(57) ABSTRACT

An electronic device includes a main body and a support mechanism assembled within the main body. The main body includes a bottom plate and a hinged portion adjacent to an edge of the main body, the bottom plate defines an ejecting hole. The support mechanism includes a rotating assembly rotatably hinged to the hinged portion, and a support assembly movably assembled with the rotating assembly, a distal end of the support assembly aligns with the ejecting hole of the bottom plate. The support assembly is capable of being partially ejected out by the rotating assembly to pass through the ejecting hole of the bottom plate, and exposed to the outside of the main body to support the whole electronic device in a use mode. The support assembly is also capable of being retracted back into the main body in an unused state.

16 Claims, 9 Drawing Sheets

ELECTRONIC DEVICE WITH SUPPORT MECHANISM

BACKGROUND

1. Technical Field

The present disclosure generally relates to electronic devices, and more particularly, to an electronic device with a support mechanism.

2. Description of Related Art

Electronic devices such as notebook computers, tablet PCs and electronic books readers are popular due to their portability and a multiple entertainment functions. In use, such an electronic device may be handheld or set on a desk or a lap. This may not achieve an optimum display angle and is also often inconvenient. In order to solve the problem, a plurality of support mechanisms is provided to support the electronic device. However, these existing support mechanisms are generally complicated and relatively large, thus it is inconvenient to carry such support mechanisms.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
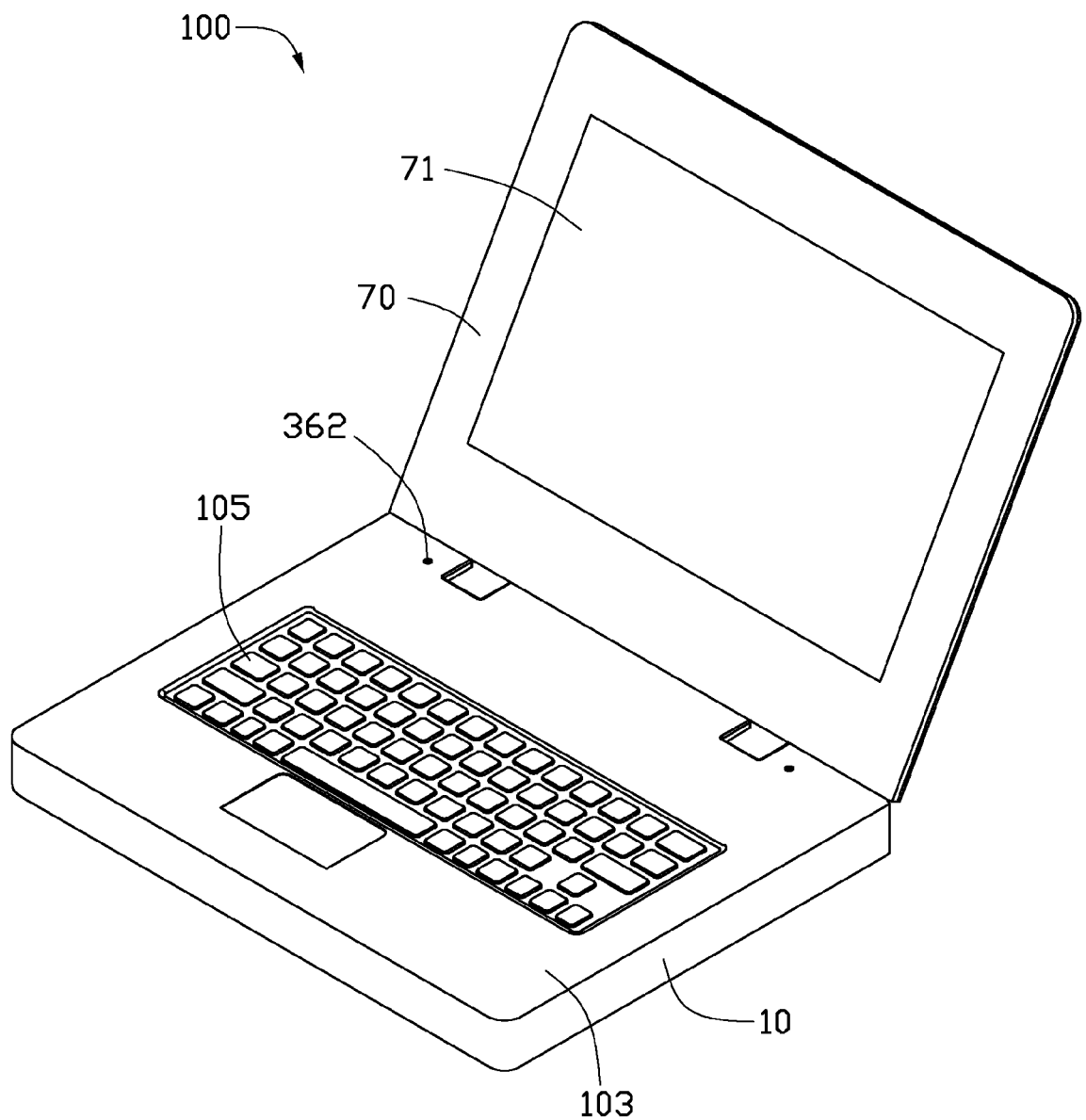
FIG. 1 shows an isometric view of an embodiment of an electronic device equipped with a support mechanism.
Figure 2:
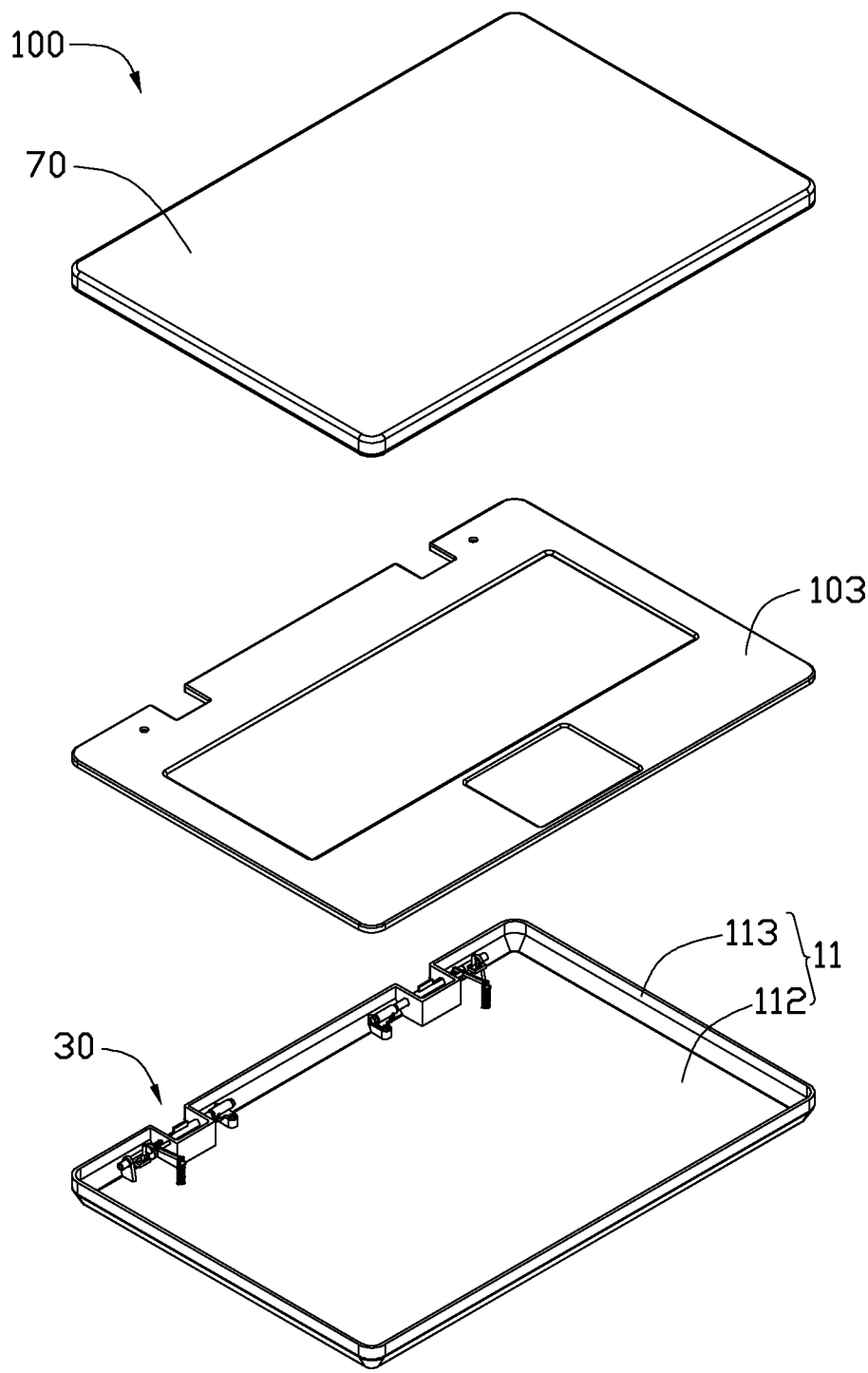
FIG. 2 shows an exploded, isometric view of the electronic device of FIG. 1.

FIGS. 1 and 2, illustrate an embodiment of an electronic device 100. The electronic device 100 includes a main body 10, two support mechanisms 30, and a cover body 70. The two support mechanisms 30 are assembled opposite to each other within the main body 10, and are capable of being ejected out from the main body 10 to support the main body 10, if in use. The cover body 70 is rotatably and adjustably assembled with the main body 10 by the two support mechanisms 30. In the illustrated embodiment, the electronic device 100 is a foldable notebook computer.

The main body 10 includes a base shell 11 and a top shell 103 detachably mounted on the base shell 11. In the illustrated embodiment, the top shell 103 is a keyboard shell defining a keyboard area 105.

Figure 3:
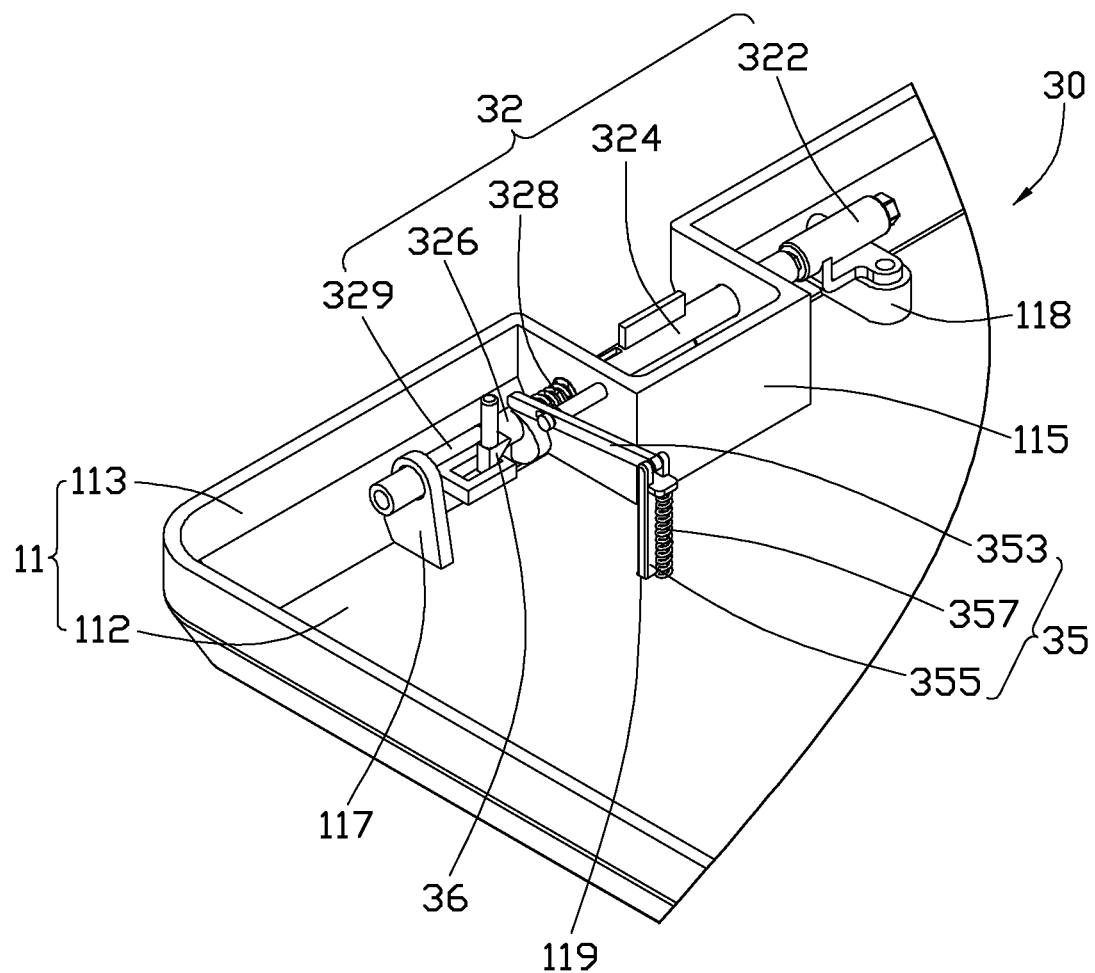
FIG. 3 shows a partial, assembled and isometric view of the electronic device of FIG. 2.
Figure 4:
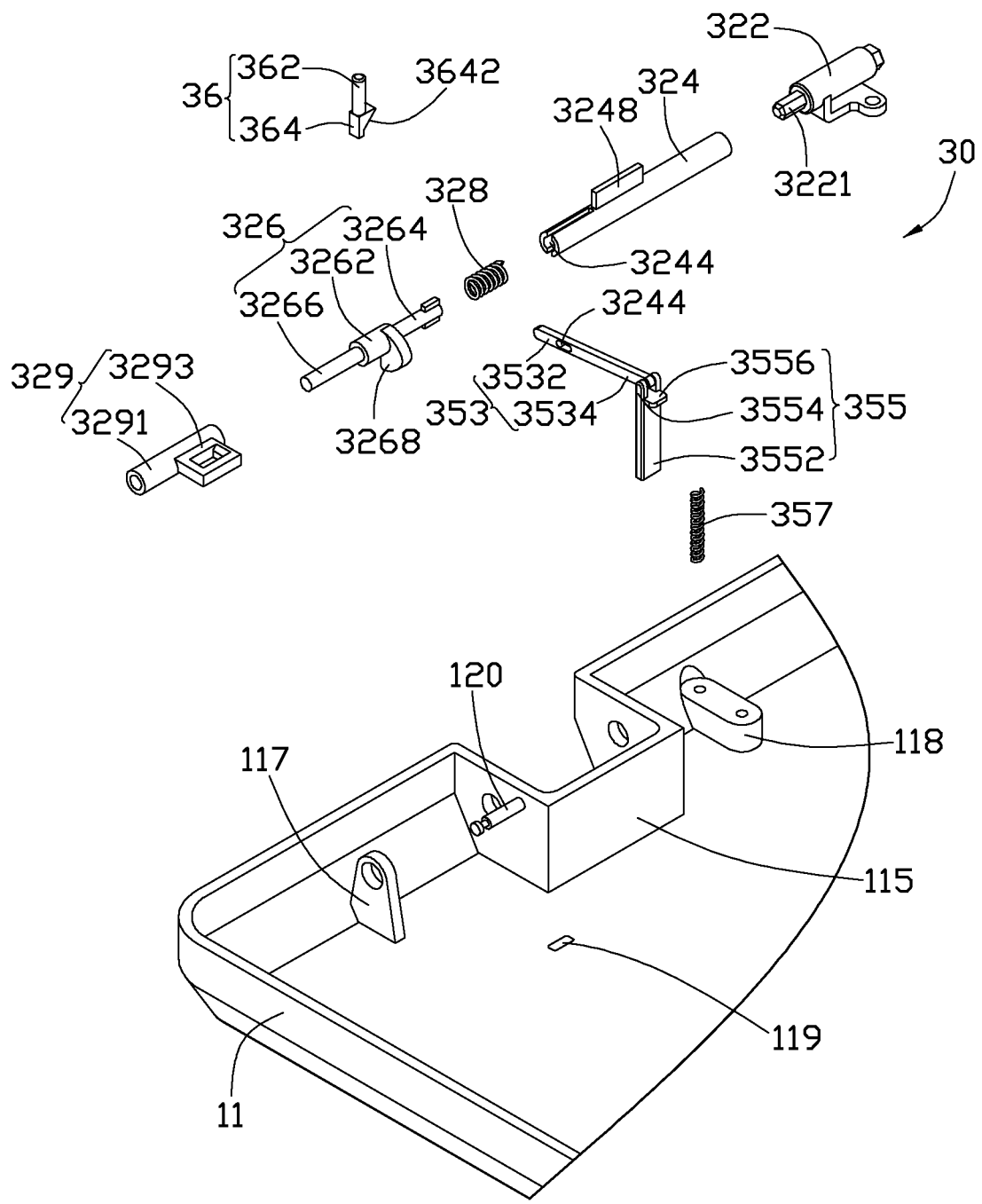
FIG. 4 shows an exploded, isometric view of the electronic device of FIG. 3.

Also referring to FIGS. 3 and 4, the base shell 11 includes a substantially rectangular bottom plate 112 and a peripheral wall 113 extending and bending from a peripheral edge of the bottom plate 112. Two hinged portions 115 are oppositely formed on the bottom plate 112 and positioned adjacent to a same edge of the base shell 11, for hinging with the cover body 70. In the illustrated embodiment, the two hinged portions 115 are both substantially U-shaped and recessed from an outer surface of an edge of the peripheral wall 113. Each hinged portion 115 includes a positioning post 120 protruding from a first sidewall of the hinged portion 115. The positioning post 120 is positioned parallel to the bottom plate 112. The hinged portion 115 further includes a hinged block 117 and a fixing block 118. The hinged block 117 is formed on the bottom plate 112 and positioned adjacent to the first sidewall of the hinged portion 115 and opposite to the positioning post 120. The fixing block 118 is also formed on the bottom plate 112 and positioned adjacent to a second sidewall of the hinged portion 115, away from the corresponding positioning post 120. Two ejecting holes 119 are defined through the bottom plate 112 and respectively located adjacent to the corresponding two hinged portions 115.

Also referring to FIG. 4, the two support mechanisms 30 are respectively mounted to the two hinged portions 115 of the base shell 11. Each support mechanism 30 includes a rotating assembly 32, a support assembly 35, and a pushing member 36. The rotating assembly 32 is rotatably hinged to the hinged portion 115, with two ends of the rotating assembly 32 respectively connected to the hinged block 117 and the fixing block 118. The support assembly 35 is movably assembled to the bottom plate 112, located adjacent to the ejecting hole 119, and is further connected with the rotating assembly 32. In use, the support assembly 35 is capable of being partially ejected out by passing through the corresponding ejecting hole 119 of the bottom plate 112, and exposed to the outside of the bottom of the main body 10, to support the whole electronic device 100. The pushing member 36 is movably assembled within the main body 10, and assembled with the rotating assembly 32 for driving the support assembly 35 to return back to its original position, and received within the main body 10 of the electronic device 100, in an unused state. The support assembly 35 is also capable of being retracted and received within the main body 10 by manually rotating the cover body 70 to overlap on the main body 10.

The rotating assembly 32 includes a positioning bracket 322, a hinged shaft 324, a transmission shaft 326, an elastic member 328, and a sleeve 329. The positioning bracket 322 is fixed with the fixing block 118, and includes a positioning portion 3221 facing toward the second sidewall of the hinged portion 115. In the illustrated embodiment, the positioning portion 3221 is a hexagonal post for facilitating positioning the cover body 70 at different preset viewing angle relative to the main body 10, when rotating the cover body 70 relative to the main body 10.

The hinged shaft 324 is rotatably hinged to the hinged portion 115. A first end of the hinged shaft 324 is connected to the positioning portion 3221 of the positioning bracket 322. A second end of the hinged shaft 324 defines a latching slot 3244. A releasing arm 3248 is formed on a substantially middle portion of the hinged shaft 324. The releasing arm 3248 is exposed outside of the main body 10.

The transmission shaft 326 includes a cylindrical main shaft 3262, a latching portion 3264 formed on a first end of the main shaft 3262, and a substantially cylindrical sleeving portion 3266 coaxially formed on an opposite second end of the main shaft 3262. A cam portion 3268 is formed on the main shaft 3262 and positioned adjacent to the latching portion 3264. The latching portion 3264 is substantially T-shaped and latches with the corresponding latching slot 3244 of the hinged shaft 324. The sleeving portion 3266 is sleeved with the corresponding sleeve 329.

The elastic member 328 is sleeved on the latching portion 3264 of the transmission shaft 326, and elastically sandwiched between the cam portion 3268 and the hinged shaft 324, such that, the transmission shaft 326 is capable of being elastically and retractably moved relative to the hinged shaft 324, during use.

The sleeve 329 includes a hollow cylindrical base body 3291, and a pushing portion 3293 formed on an outer periphery of the base body 3291. A first end of the sleeve 329 is rotatably assembled to the hinged block 117, and an opposite second end of the sleeve 329 is movably sleeved on the sleeving portion 3266 of the transmission shaft 326. The pushing portion 3293 is a hollow rectangular frame in the illustrated embodiment. The pushing portion 3293 engages with the corresponding pushing member 36, thereby pushing the corresponding transmission shaft 326 axially.

In the illustrated embodiment, the support assembly 35 is a link mechanism, and includes a connecting rod 353, a support rod 355, and an elastic member 357. The connecting rod 353 is a substantially rectangular bar. Two ends of the connecting rod 353 respectively form a resisting portion 3532 and a pivotal portion 3534. The resisting portion 3532 resists against the corresponding cam portion 3268 of the transmission shaft 326. The pivotal portion 3534 is hinged with the corresponding support rod 355. A sliding slot 3536 is defined through the connecting rod 353 corresponding to the positioning post 120 of the hinged portion 115, and positioned adjacent to the resisting portion 3532.

The support rod 355 is a substantially rectangular bar-shaped plate, and is hinged to the pivotal portion 3534 of the connecting rod 353. The support rod 355 is positioned above and aligns with the corresponding ejecting hole 119 of the bottom plate 112. The support rod 355 includes a support portion 3552 and a connecting portion 3554 protruding from a first end of the support portion 3552. The support portion 3552 is positioned perpendicular to the bottom plate 112, with an opposite second end thereof inserted into and partially received within the corresponding ejecting hole 119. A resisting arm 3556 extends from the first end of the support portion 3552, perpendicularly, and is positioned parallel to the bottom plate 112. The connecting portion 3554 is hinged to the corresponding pivotal portion 3534 of the connecting rod 353. The elastic member 357 is elastically sandwiched between the bottom plate 112 and the resisting arm 3556.

The pushing member 36 is movably mounted upon the pushing portion 3293 of the sleeve 329. The pushing member 36 includes a substantially cylindrical pressing portion 362 and a resisting end 364. The pressing portion 362 is movably passing through the top shell 103 and partially exposed to the outside. The resisting end 364 is substantially wedge-shaped, and positioned above the pushing portion 3293 of the sleeve 329. The resisting end 364 has a resisting inclined surface 3642 movably resisting against an inner side surface of the pushing portion 3293, for pushing against the whole transmission shaft 326.

FIG. 1 also illustrates the cover body 70 of the illustrated embodiment. The cover body 70 includes a display screen 71 and is securely mounted to the releasing arm 3248 of the hinged shaft 324, such that, the cover body 70 is rotatably hinged to the main body 10 by the two support mechanisms 30.

FIG. 3, illustrates the positioning bracket 322 is fixed to the fixing block 118 of the base shell 11, when assembling the electronic device 100. The hinged shaft 324 is rotatably hinged to the hinged portion 115, the first end of the hinged shaft 324 is rotatably sleeved with the positioning portion 3221 of the positioning bracket 322. The releasing arm 3248 is exposed outside of the main body 10. The transmission shaft 326 is coaxially assembled with the hinged shaft 324, with the latching portion 3264 latching into the corresponding latching slot 3244 of the hinged shaft 324. The elastic member is sleeved on the latching portion 3264 of the transmission shaft 326, and elastically sandwiched between the cam portion 3268 and the hinged shaft 324, such that, the transmission shaft 326 is capable of being elastically and retractably moved relative to the hinged shaft 324 during usage. The sleeve 329 is rotatably assembled to the hinged block 117, and is movably sleeved with the sleeving portion 3266 of the transmission shaft 326. The support assembly 35 is movably assembled to the hinged portion 115, with the support rod 355 positioned above and aligning with the corresponding ejecting hole 119 of the bottom plate 112. The resisting portion 3532 of the connecting rod 353 resists against the corresponding cam portion 3268 of the transmission shaft 326. The positioning post 120 passes through the corresponding sliding slot 3536 of the connecting rod 353. The elastic member 357 is elastically sandwiched between the bottom plate 112 and the resisting arm 3556. The cover body 70 is fixedly mounted to the releasing arm 3248 of the hinged shaft 324, such that, the cover body 71 is rotatably hinged to the main body 10 to finish the assembly of the electronic device 100.

Figure 5:
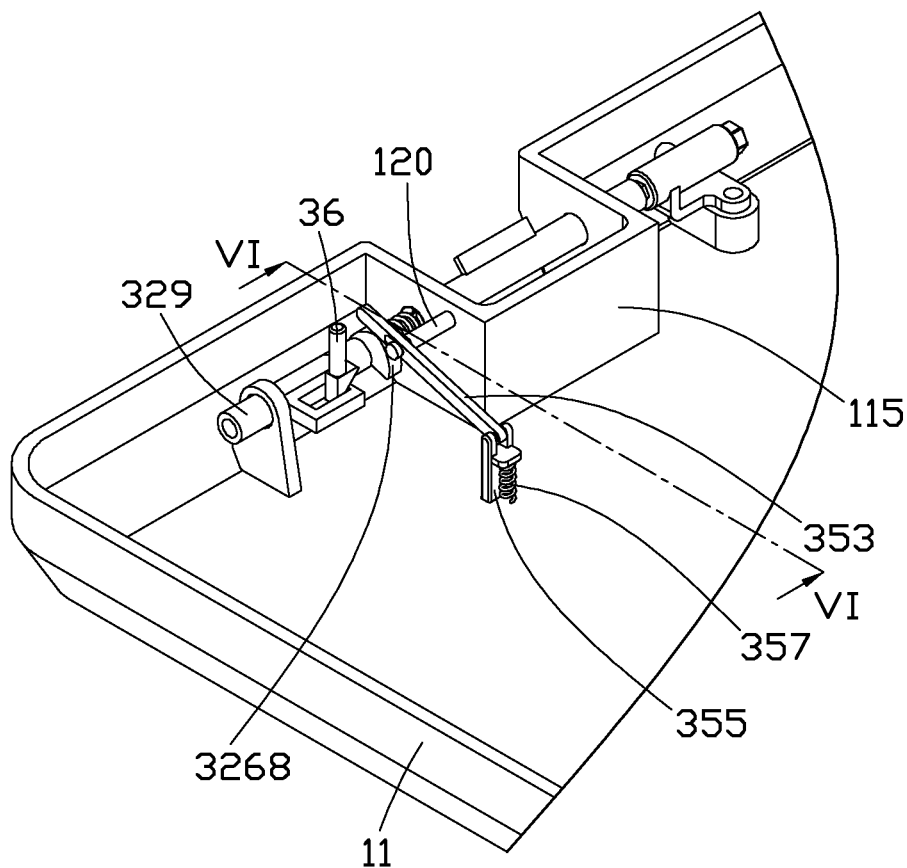
FIG. 5 is similar to FIG. 3, but showing another state of the electronic device.
Figure 6:
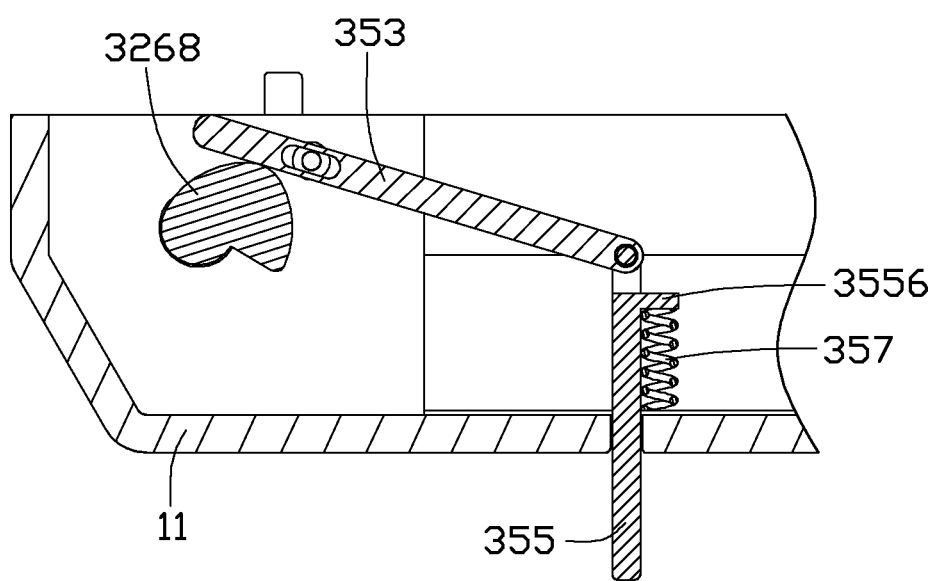
FIG. 6 shows a cross-sectional view of the electronic device taken along line VI-VI of FIG. 5.
Figure 7:
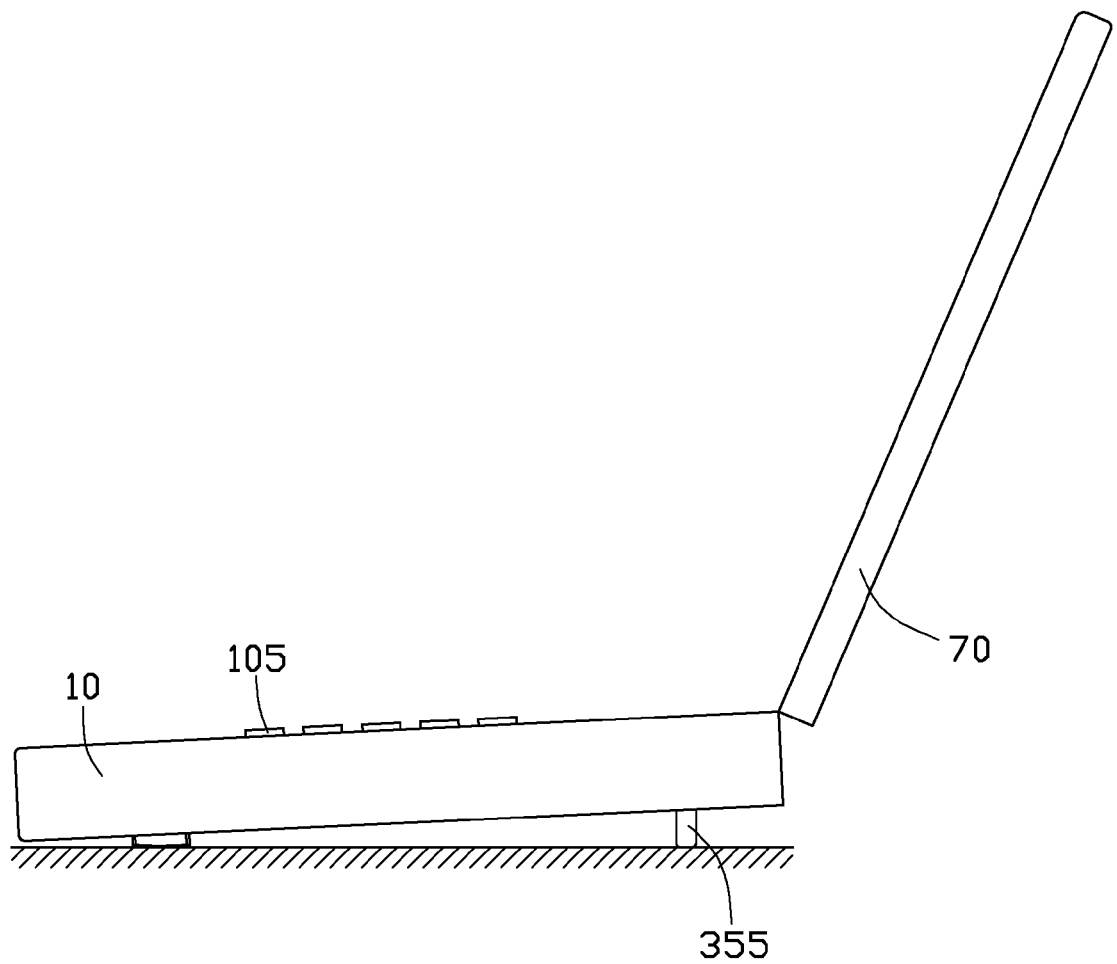
FIG. 7 shows a side view of the electronic device of FIG. 1, wherein, the support mechanism of the electronic device is in a working state.

FIGS. 5 through 7, illustrate that in use, the cover body 70 is rotated away from the main body 10 to make the cover body 70 stop at a preset viewing angle relative to the main body 10. During the rotation process, the cam portion 3268 together with the hinged shaft 324 is rotated. The resisting portion 3532 of the connecting rod 353 is ejected upward by the cam portion 3268, thus, the support rod 355 is driven to pass through the ejecting hole 119 and exposed to the outside of the bottom of the main body 10, to support the whole electronic device 100. When closing the cover body 70 toward the main body 10, the hinged shaft 324 is rotated together with the cover body 70. Meanwhile, the cam portion 3268 of the transmission shaft 326 is driven to rotate, the resisting portion 3532 is released from the cam portion 3268, the support rod 355 is then driven to retract back to its original position and received within the main body 10, under an elastic force of the elastic member 357.

Figure 8:
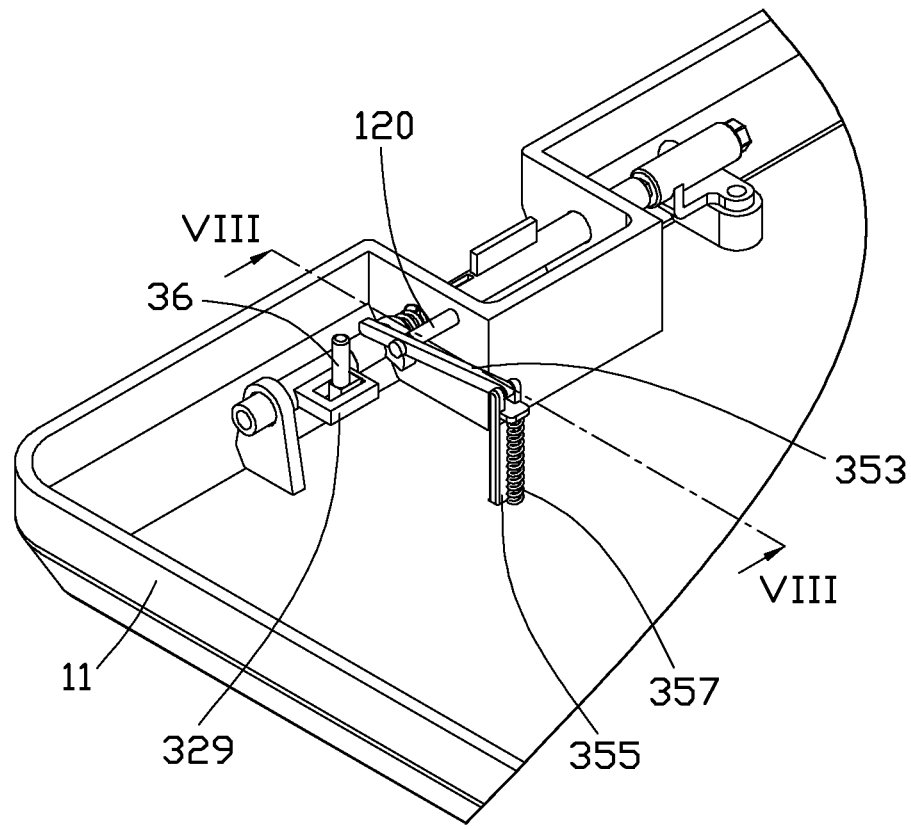
FIG. 8 is similar to FIG. 3, but showing the support mechanism of the electronic device in an unused state.
Figure 9:
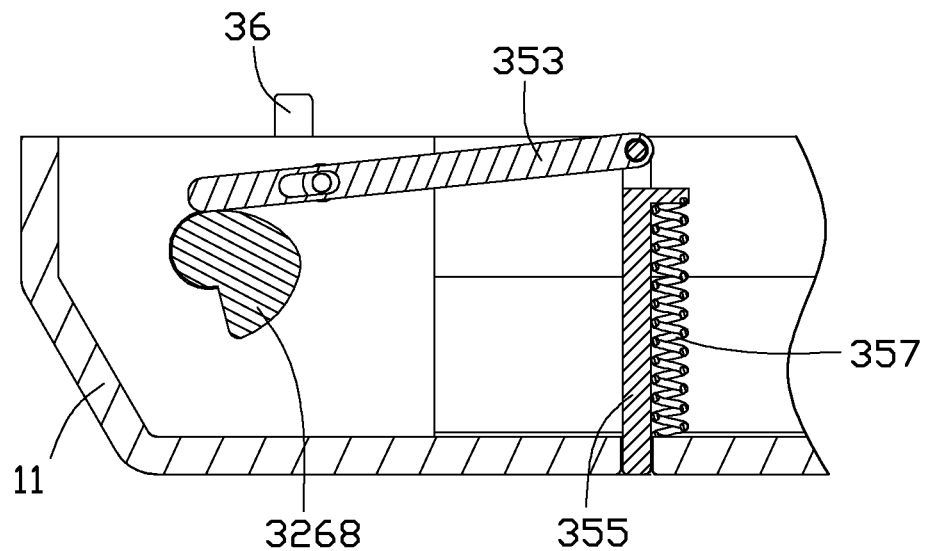
FIG. 9 shows a cross-sectional view of the electronic device taken along line VIII-VIII of FIG. 8.

FIGS. 8 and 9, illustrate that pressing the pushing member 36 can also retract the support rod 355 under a using mode. When pressing the pressing portion 362 of the pushing member 36, the resisting end 364 resists against the pushing portion 3293 of the sleeve 329, thereby pushing the transmission shaft 326 toward the hinged portion 115 and the hinged shaft 324. Meanwhile, the resisting portion 3532 is released from the cam portion 3268, the support rod 355 is then driven to retract back to its original position and received within the main body 10, under an elastic force of the elastic member 357. When releasing the pressing portion 362 of the pushing member 36, the transmission shaft 326 is driven to move toward the hinged block 117 and returns to its original position under the elastic force of the elastic member 328. The resisting portion 3532 of the connecting rod 353 resists against the cam portion 3268 thereby preventing the transmission shaft 326 from moving, and keeping the support rod 355 received within the main body 10.

It is to be noted that, the number of the support mechanisms 30 is not limited to two, it can also be only one, or more than two according to the actual needs. Meanwhile, the number of the hinged portion 115 is also not limited to two, it can also be only one, or more than two according to the actual needs.

It is to be noted that, the cover body 70 may be omitted. Namely, the electronic device 100 may be a panel computer, or an electronic book, for example.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. An electronic device comprising:
 a main body comprising a bottom plate and at least one hinged portion adjacent to an edge of the main body, the bottom plate defining at least one ejecting hole; and
 at least one support mechanism assembled within the main body, each support mechanism comprising:
  a rotating assembly rotatably hinged to the hinged portion; and
  a support assembly movably assembled with the rotating assembly, a distal end of the support assembly aligning with the at least one ejecting hole of the bottom plate;
 wherein, the support assembly is capable of being partially ejected out by the rotating assembly to pass through the at least one ejecting hole of the bottom plate, and exposed to the outside of the main body to support the whole electronic device in a use mode; the support assembly is also capable of being retracted back into the main body in an unused state.

2. The electronic device of claim 1, wherein the support mechanism further comprises a pushing member movably assembled within the main body, and assembled with the rotating assembly for driving the support assembly to return back to its original position, and received within the main body in the unused state.

3. The electronic device of claim 2, wherein the rotating assembly comprises a transmission shaft rotatably assembled within the main body, and a cam portion formed on the transmission shaft; the support assembly comprises a support rod, a first elastic member, and a connecting rod hinged with the support rod; the support rod is positioned above and aligns with the corresponding ejecting hole of the bottom plate, the first elastic member is elastically sandwiched between the bottom plate and the support rod; a distal end of the connecting rod resists against the cam portion of the transmission shaft; the pushing member is mounted above the transmission shaft for driving the support assembly.

4. The electronic device of claim 3, wherein the rotating assembly further comprises a second elastic member sleeved on the transmission shaft and a sleeve, the sleeve comprises a hollow base body, and a pushing portion formed on the base body; the base body is movably sleeved on the transmission shaft, the pushing member is positioned above and resists against the pushing portion, thereby connecting the sleeve and the transmission shaft together.

5. The electronic device of claim 4, wherein the pushing portion is a hollow frame and engages with the pushing member, thereby pushing the transmission shaft axially.

6. The electronic device of claim 4, wherein the rotating assembly further comprises a hinged shaft rotatably hinged to the hinged portion and coaxially connected with the transmission shaft; a releasing arm is formed on the hinged shaft and exposed to the outside of the main body.

7. The electronic device of claim 6 further comprising a cover body having a display screen, wherein the cover body is fixedly mounted to the releasing arm of the hinged shaft, such that, the cover body is rotatably hinged to the main body.

8. The electronic device of claim 7, wherein the hinged portion further comprises a hinged block and a fixing block, the hinged block and the fixing block are oppositely formed on the bottom plate and positioned adjacent to two sides of the hinged portion; the sleeve is rotatably assembled to the hinged block and sleeved with the transmission shaft; the rotating assembly further comprises a positioning bracket fixed to the fixing block and coaxially connected with the hinged shaft.

9. The electronic device of claim 4, wherein the main body comprises a base shell and a top shell detachably mounted on the base shell, the base shell comprises the bottom plate and a peripheral wall extending and bending from a peripheral edge of the bottom plate, the hinged portion is positioned adjacent to a same edge of the base shell; the pushing member is partially exposed from the top shell.

10. An electronic device comprising:
 a main body comprising a base shell and a top shell mounted on the base shell, the base shell comprising a bottom plate and two hinged portions adjacent to an edge of the base shell, the bottom plate defining two ejecting holes; and
 two support mechanisms oppositely mounted to the two hinged portions of the base shell and received within the main body, and
 a cover body rotatably and adjustably assembled to the main body by means of the two support mechanisms;
 wherein, each support mechanism comprises a rotating assembly rotatably hinged to one corresponding hinged portion, and a support assembly movably assembled with the rotating assembly, a distal end of the support assembly aligning with one ejecting hole of the bottom plate;
 wherein, the support assembly is capable of being partially ejected out by the rotating assembly to pass through a corresponding ejecting hole of the bottom plate, and exposed to the outside of the main body to support the whole electronic device in a use mode; the support assembly is also capable of being retracted back into the main body in an unused state.

11. The electronic device of claim 10, wherein the support mechanism further comprises a pushing member movably assembled within the main body, and assembled with the rotating assembly for driving the support assembly to return back to its original position, and received within the main body in the unused state.

12. The electronic device of claim 11, wherein the rotating assembly comprises a transmission shaft rotatably assembled within the main body, and a cam portion formed on the transmission shaft; the support assembly comprises a support rod, a first elastic member, and a connecting rod hinged with the support rod; the support rod is positioned above and aligns with the corresponding ejecting hole of the bottom plate, the first elastic member is elastically sandwiched between the bottom plate and the support rod; a distal end of the connecting rod resists against the cam portion of the transmission shaft; the pushing member is mounted above the transmission shaft for driving the support assembly.

13. The electronic device of claim 12, wherein the rotating assembly further comprises a second elastic member sleeved on the transmission shaft and a sleeve, the sleeve comprises a hollow base body, and a pushing portion formed on the base body; the base body is movably sleeved on the transmission shaft, the pushing member is positioned above and resists against the pushing portion, thereby connecting the sleeve and the transmission shaft together.

14. The electronic device of claim 13, wherein the pushing portion is a hollow frame and engages with the pushing member, thereby pushing the transmission shaft axially.

15. The electronic device of claim 13, wherein the rotating assembly further comprises a hinged shaft rotatably hinged to the hinged portion and coaxially connected with the transmission shaft; a releasing arm is formed on the hinged shaft and exposed to the outside of the main body; the cover body is fixed with the releasing arm of the hinged shaft.

16. The electronic device of claim 15, wherein the hinged portion further comprises a hinged block and a fixing block, the hinged block and the fixing block are oppositely formed on the bottom plate and positioned adjacent to two sides of the hinged portion; the sleeve is rotatably assembled to the hinged block and sleeved with the transmission shaft; the rotating assembly further comprises a positioning bracket fixed to the fixing block and coaxially connected with the hinged shaft.

* * * * *